United States Patent
Ghafurian et al.

(10) Patent No.: US 7,893,563 B2
(45) Date of Patent: Feb. 22, 2011

(54) ELECTRICAL DISTRIBUTION FEEDER SYSTEM AND METHOD OF OPERATION

(75) Inventors: Abdol Reza Ghafurian, Randolph, NJ (US); Noel Rivera, Pompton Plains, NJ (US)

(73) Assignee: Consolidated Edison Company of New York, Inc., New York, NY (US)

( * ) Notice: Subject to any disclaimer, the term of this patent is extended or adjusted under 35 U.S.C. 154(b) by 316 days.

(21) Appl. No.: 12/246,590

(22) Filed: Oct. 7, 2008

(65) Prior Publication Data

US 2010/0087962 A1    Apr. 8, 2010

(51) Int. Cl.
*H02J 1/02* (2006.01)
*H02J 3/00* (2006.01)

(52) U.S. Cl. ...................................................... 307/86

(58) Field of Classification Search .................. 307/43, 307/85, 86, 112; 700/286, 294
See application file for complete search history.

(56) References Cited

U.S. PATENT DOCUMENTS

| | | | |
|---|---|---|---|
| 2,785,319 A | 3/1957 | Simpson et al. | |
| 4,402,059 A | 8/1983 | Kennon et al. | |
| 5,784,237 A | 7/1998 | Velez | |
| 6,275,366 B1 | 8/2001 | Gelbien et al. | |
| 7,265,957 B2 | 9/2007 | Brucker | |
| 2003/0063421 A1* | 4/2003 | Smith et al. | 361/93.2 |

* cited by examiner

*Primary Examiner*—Jared J Fureman
*Assistant Examiner*—Carlos Amaya
(74) *Attorney, Agent, or Firm*—Cantor Colburn LLP (57) ABSTRACT

A system and method for operating a transferable feeder system on an electrical distribution system is provided. The system includes a controller that is disposed in communication with switches associated with feeders of a first substation and circuit breakers associated with a second substation. The first substation and second substation are electrically coupled in a manner to allow load transfer from the first substation to the second substation. The system is arranged to disconnect a first pair of circuits from the first substation before connecting the pair of circuits to the second substation while leaving a third circuit coupled to the first substation. During the entire process of transferring load from one substation to the second substation, customer load does not experience any interruption in electrical service.

20 Claims, 4 Drawing Sheets

FIG. 4 ized power production facilities and transferred at high voltages to local substations. The local substations transform the electrical power to a medium or low voltage. The electrical power is subsequently distributed through feeders to local distribution networks. In general, electrical load may be transferred between distribution feeders that are connected to the same substation.

ELECTRICAL DISTRIBUTION FEEDER SYSTEM AND METHOD OF OPERATION

BACKGROUND OF THE INVENTION

The present invention relates generally to electrical power distribution networks and more particularly to a transferable feeder system that allows the transfer of loads from one substation to another substation without interrupting the flow of electrical power to the loads.

Electrical power is typically produced at centralized power production facilities and transferred at high voltages to local substations. The local substations transform the electrical power to a medium or low voltage. The electrical power is subsequently distributed through feeders to local distribution networks. In general, electrical load may be transferred between distribution feeders that are connected to the same substation.

It is more difficult, however, to switch loads between networks that receive power from different substations. Since power received by each substation may come from a different source, the electrical power at one substation may have different characteristics, such as voltage and phase angle for example, than an adjacent substation. While these differences may be small, they can be large enough to make the two networks incompatible for interconnection purposes. In general, to switch a load or a group of loads from one network to an adjacent network requires the physical disconnection of hardware from the original network and reconnection to the new network. This disconnection and reconnection requires momentary interruption of service while the change is made.

Some circumstances, such as unusually high demand for example, may warrant the effort of switching loads from one network or substation to another. This is usually accomplished in areas where over-head wires are installed and connected load is radial. It should be appreciated that this type of switching is not readily applicable where underground networks are installed.

One further issue is that such a change usually requires a momentary interruption in service. Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical service While circumstances may make it desirable to switch loads from one network to another, the process may have detrimental impacts on the utilities metrics.

Thus, while existing electrical distribution systems are suitable for their intended purpose, there remains a need for improvements. In particular, there remains a need for improvement regarding the ability to change loads from one network or a substation to another without interrupting the flow of electrical power to the load.

SUMMARY OF THE INVENTION

A method transferring electrical power to a load from a first substation to a second substation is provided. The method includes the step of opening a first pair of switches associated with the first substation, wherein the first pair of switches provides electrical power to a first and second circuit. A first pair of circuit breakers associated with the second substation are closed, wherein the first pair of circuit breakers provide electrical power to the first and second circuit. A second pair of switches associated with the first substation are opened, wherein the second pair of switches provide electrical power to a third and fourth circuit. Finally, a second pair of circuit breakers associated with the second substation are closed, wherein the second pair of circuit breakers provide electrical power to the third and fourth circuit.

A method of operating a transferable feeder system is also provided. The method includes the step of determining an electrical phase angle difference between a first substation and a second substation. It is determined if the phase angle difference exceeds a threshold. A phase angle associated with the second substation is adjusted such that the phase angle difference is within the threshold. A first switch and a second switch associated with the first substation are opened, wherein the first switch and the second switch provide electrical current to a first and second circuit. A first circuit breaker and second circuit breaker associated with the second substation are closed, wherein the first circuit breaker and the second circuit breaker provide electrical current to the first circuit and the second circuit. A third switch and a fourth switch associated with the first substation are opened, wherein the third switch and forth switch provide electrical current to a third circuit and forth circuit. Finally, a third circuit breaker and forth circuit breaker associated with the second substation are closed, wherein the third circuit breaker and forth circuit breaker provide electrical current to the third and forth circuits.

A transferable feeder system is also provided that includes a first substation having a first pair of feeders and a second pair of feeders, wherein each feeder in the first pair of feeders and the second pair of feeders has an associated switch. A second substation is provided having a third pair of feeders electrically coupled to the first pair of feeders, and a fourth pair of feeders electrically coupled to the second pair of feeders, wherein each feeder in the third pair of feeders and the fourth pair of feeders has an associated circuit breaker. At least one load is electrically coupled to the first pair of feeders, the second pair of feeders, the third pair of feeders and the fourth pair of feeders. A controller is associated with the first substation and the second substation, where the controller is disposed in communication with the switches associated with the first pair of feeders and the circuit breakers associated with the third pair of feeders. The controller includes a processor responsive to executable computer instructions for opening the switches associated with the first pair of feeders and closing the circuit breakers associated with the third pair of feeders in response to receiving a command signal.

BRIEF DESCRIPTION OF THE DRAWINGS

Referring now to the drawings, which are meant to be exemplary and not limiting, and wherein like elements are numbered alike.

DETAILED DESCRIPTION

Figure 1:
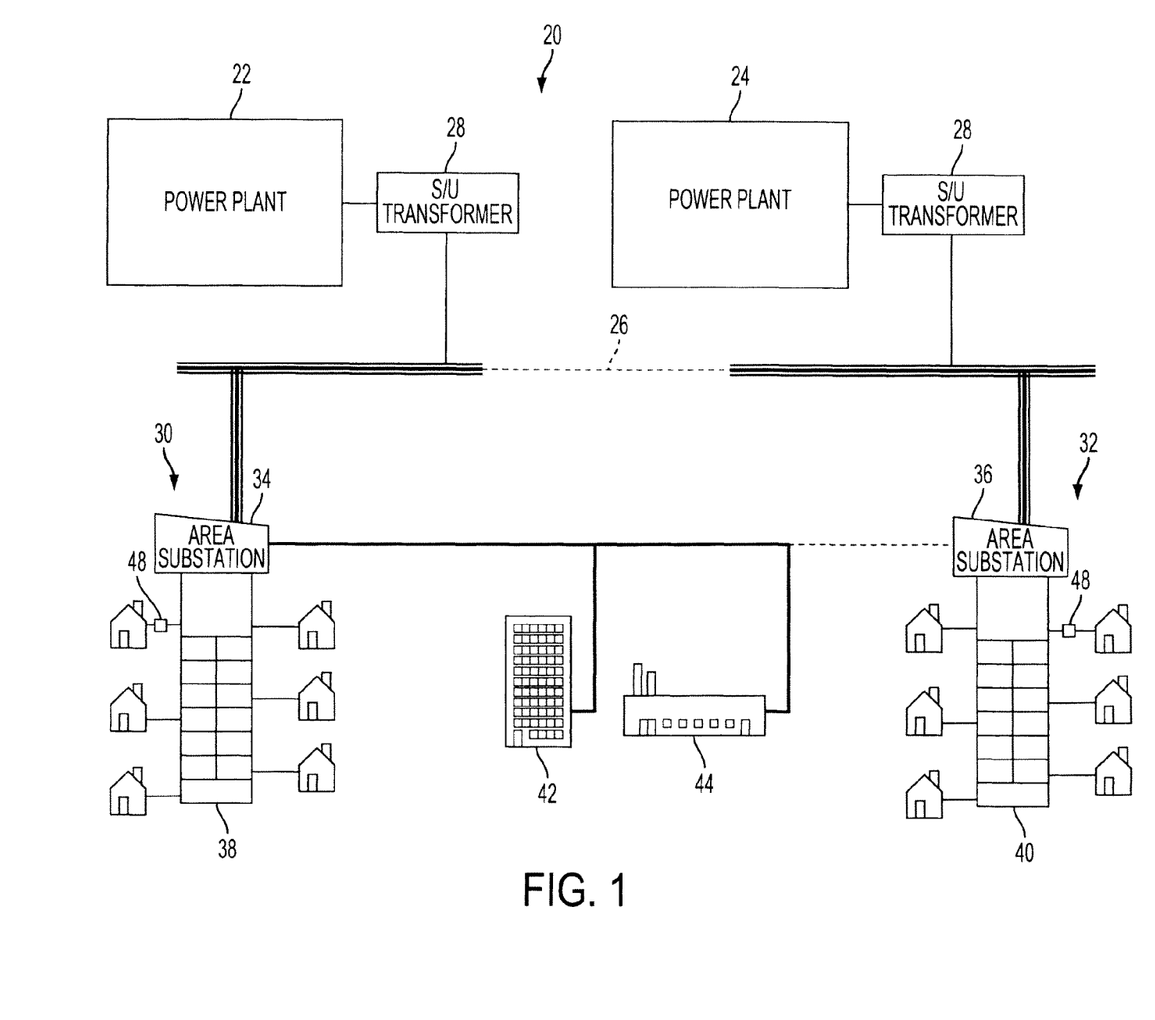
FIG. 1 is a schematic illustration of a utility electrical transmission and distribution system.

FIG. 1 illustrates an exemplary embodiment of a utility electrical transmission and distribution system 20. The utility system 20 includes one or more power plants 22, 24 connected in parallel to a main transmission system 26 by multiple step-up transformers 28. The power plants 22, 24 may include, but are not limited to: coal, nuclear, natural gas, or incineration power plants. Additionally, the power plants 22, 24 may include one or more hydroelectric, solar, or wind turbine power plants. The step-up transformers 28 increase the voltage from that produced by the power plants 22, 24 to a high voltage, such as 138 kV for example, to allow long distance transmission of the electric power over main transmission system 26. It should be appreciated that additional components such as transformers, switchgear, fuses and the like (not shown) may be incorporated into the transmission and distribution system 20 as needed to ensure the safe and efficient operation of the system. The transmission and distribution system 20 is typically interconnected with one or more other utility networks to allow the transfer of electrical power into or out of the transmission and distribution system 20.

The main transmission system 26 typically consists of high voltage transmission power lines, anywhere from 69 KV to 500 KV for example, and associated transmission and distribution equipment which carry the electrical power from the point of production at the power plant 22 to the end users located on local electrical distribution systems 30, 32. The local distribution systems 30, 32 are connected to the main distribution system by area substations 34, 36 that are connected to the first distribution system 30 and second distribution system respectively. The area substations 34, 36 reduce the transmission voltage to distribution levels such as 13 KV, 27 KV or 33 KV for the end users. Area substations 34, 36 typically contain three or more transformers, switching, protection and control equipment as well as circuit breakers to interrupt faults such as short circuits or over-load currents that may occur. Substations 34, 36 may also include equipment such as fuses, surge protection, controls, meters, capacitors, load tap changers and voltage regulators.

It should be appreciated that the substations 34, 36 may both be connected to a single power plant, such as first power plant 22 for example. Alternatively, they may be connected to the main transmission system 26 such that the substations 34, 36 receive electrical power from different power stations, such as substation 34 receives electrical power from first power plant 22 and substation 36 receives electrical power from second power plant 24 as illustrated in FIG. 1 for example.

The area substations 34, 36 connect to one or two local electrical distribution networks 38, 40 respectively. These local networks 38, 40 provide electrical power to an area, such as a residential area for example. The local networks 38, 40 also include additional equipment, such as transformers 48 that adapt the voltage from that output by the substations 34, 36 to that usable by the end customers. For example, the substation 34 may distribute electrical power at 13 kV. The transformer 48 lowers the voltage to 120V/208V, which is usable by a residence. The local networks 38, 40 may further have isolated end users such as an office building 42 or a manufacturing facility 44. The area substation 34 typically has a plurality of feeder circuits that provide electrical power directly to isolated customers 42, 44. As will be discussed in more detail below, the second area substation 36 includes a plurality of feeder circuits that provide an interconnection with the isolated customers 42, 44 and first substation 34.

Figure 2:
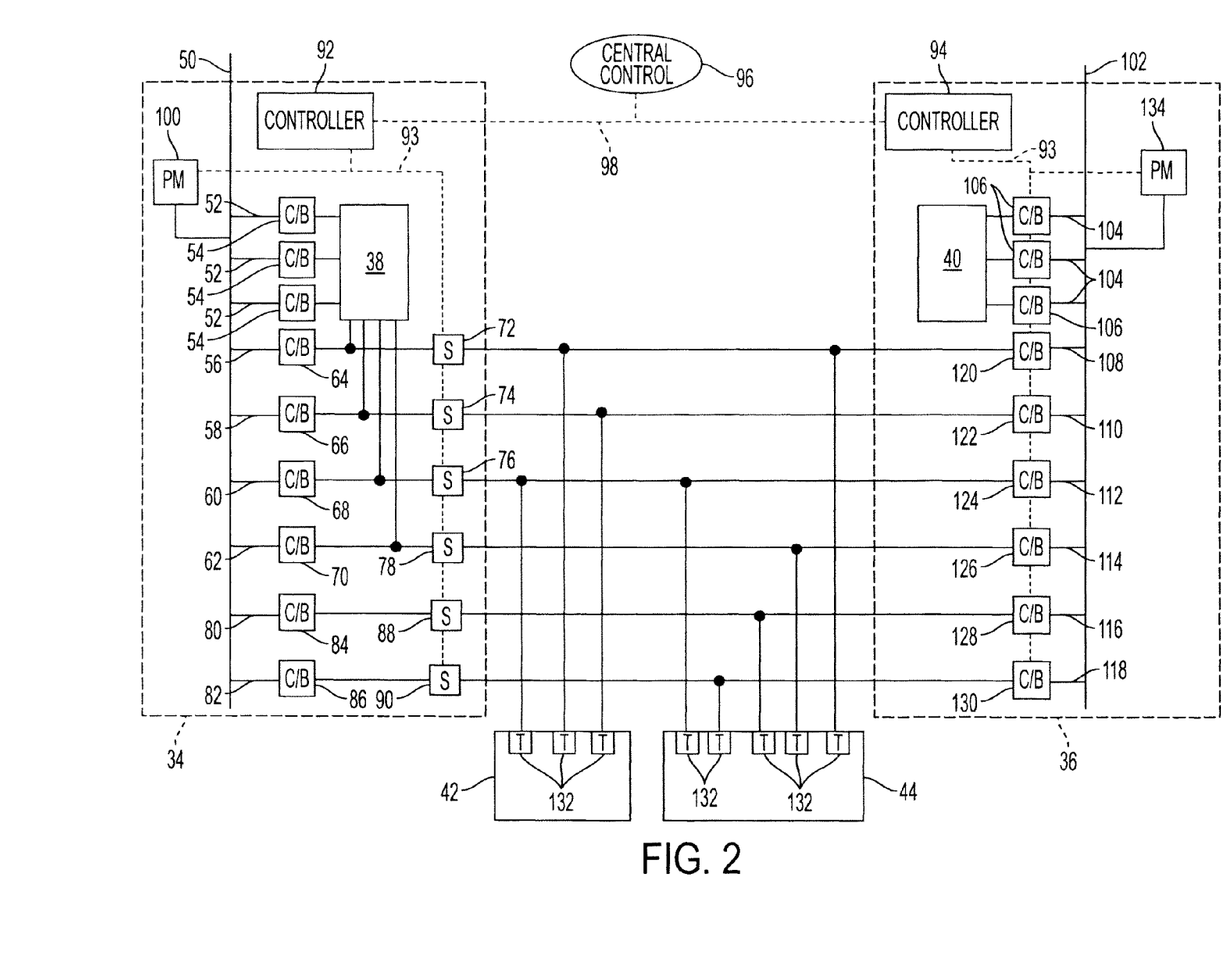
FIG. 2 is an schematic illustration of a portion of the electrical distribution system of FIG. 1 with two interconnected distribution networks in accordance with one embodiment of the invention.

Referring now to FIG. 2, an exemplary substation interconnection system will be described. The substation 34 receives electrical power from the main transmission network 26 via connection 50. The connection 50 is part of a plurality of feeders within the substation 34. A feeder is a device that allows the utility to receive the incoming electrical power and subdivide the electrical power into discrete branch circuits connected to the substation 34. In the exemplary embodiment, several of the feeders 52 transfer power into circuits that connect to the local distribution network 38. Usually, each feeder 52 includes a circuit breaker 54 that allows the connection and disconnection of the substation from the local network 38.

A second group of feeders 56, 58, 60, 62 are also coupled to connection 50. The second group of feeders 56, 58, 60, 62 is coupled to the local network 38 via circuit breakers 64, 66, 68, 70. In addition, the second group of feeders 56, 58, 60, 62 are further coupled to the isolated loads 42, 44 via medium voltage switches 72, 74, 76, 78. A third group of feeders 80, 82 are also coupled to connection 50. The third group of feeders 80, 82 is coupled to the isolated loads 42, 44 via circuit breakers 84, 86 and medium voltage switches 88, 90.

Substation 34 also includes a controller 92. The controller 92 may be any suitable device capable of receiving multiple inputs and providing control functionality to multiple devices based on the inputs. Controller 92 includes a processor that is a suitable electronic device capable of accepting data and instructions, executing the instructions to process the data, and presenting the results. The processor may accept instructions through a user interface, or through other means such as but not limited to electronic data card, voice activation means, manually operable selection and control means, radiated wavelength and electronic or electrical transfer. Therefore, the processor can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

The controller 92 is coupled to communicate with external devices via communications medium 93, these devices include medium voltage switches 72, 74, 76, 78, 88, 90 and the circuit breakers 64, 54, 66, 68, 70, 84, 86, and phase angle meter 100 for example. Controller 92 may also communicate with external devices, such as a controller 94 associated with substation 36 or a computer at a central control facility 96 via a communications medium 98. It should be appreciated that the communications mediums 93, 98 may be any suitable communications means, including wired or wireless, capable of quickly and reliably transmitting information. The communications mediums 93, 98 may also be radio connection in the 900 MHz spectrum, a leased telecommunications line (e.g. X.25, T1), a fiber network, a PSTN POTS network, a DSL telecommunications line, a cable telecommunications line, a microwave connection, a cellular connection, or a wireless connection using the IEEE 802.1 standard.

It should be appreciated that while the exemplary embodiment illustrates the controllers 92, 94 and central control 96 as discrete components, these devices may also be integrated into a single device that provides control functionality over both substations 34, 46. Further, the functionality of the controllers 92, 94 that are described herein may be distributed among several controllers that provide the control functionality. In one embodiment, the controller 92, 94 functionality is distributed into controllers associated with the devices of the substations 34, 36, such as the circuit breakers 64, 54, 66, 68, 70, 84, 86 and the medium voltage switches 72, 74, 76, 78, 88, 90 for example.

The second substation 36 is arranged similarly to the first substation 34. A connection 102 delivers electrical power from the main transmission system 26. A first group of feeders 104 delivers the electrical power to the second local distribution network 40 via circuit breakers 106. A second group of feeders 108, 110, 112, 114, 116, 118 are coupled to the feeders 56, 58, 60, 62, 80, 82 respectively Each feeder 108, 110, 112, 114, 116, 118 has an associated circuit breaker 120, 124, 126, 128, 130 that allows the individual feeders to be connected and disconnected from loads 42, 44 and their counter part feeders in substation 34. As will be discussed in more detail below, during normal operation the circuit breakers 120, 124, 126, 128, 130 are in an open position, preventing the flow of electrical current to the loads 42, 44. A phase angle meter 134 is installed to measure the phase angle characteristic of the electrical power at substation 36.

In addition to the feeders, circuit breakers and switches described above, substations 34, 36 may also include equipment such as fuses, surge protection, controls, meters, capacitors, and load tap changers for voltage regulation.

In the exemplary embodiment, the loads 42, 44 are what are commonly referred to as "isolated loads", meaning that the loads 42, 44 are directly connected to feeders 56, 58, 60, 62, 80, 82 and substation 34 and not interconnected with other branch circuits of substation 34. These types of loads include facilities such as large commercial facilities, large multistory residential or office buildings (e.g. skyscrapers) and hospitals for example. Since these types of facilities have large power requirements, they may be arranged in a multibank configuration to receive electrical power via multiple connections that are coupled to circuits fed from different feeders. The facility will also typically have transformers 132 that change the electrical characteristics of the electrical power from a medium distribution voltage, such as 13 kV or 27 kV for example, to that usable by the facility, such as 265V/460V or 120V/208V for example. It should be appreciated that while two loads 42, 44 are illustrated in the exemplary embodiment, the invention is not so limited and any number of loads 42, 44 may be so connected. Further, the multibank configuration may have three or five connections as illustrated, or may have additional connections such as four or six connections for example.

Figure 3:
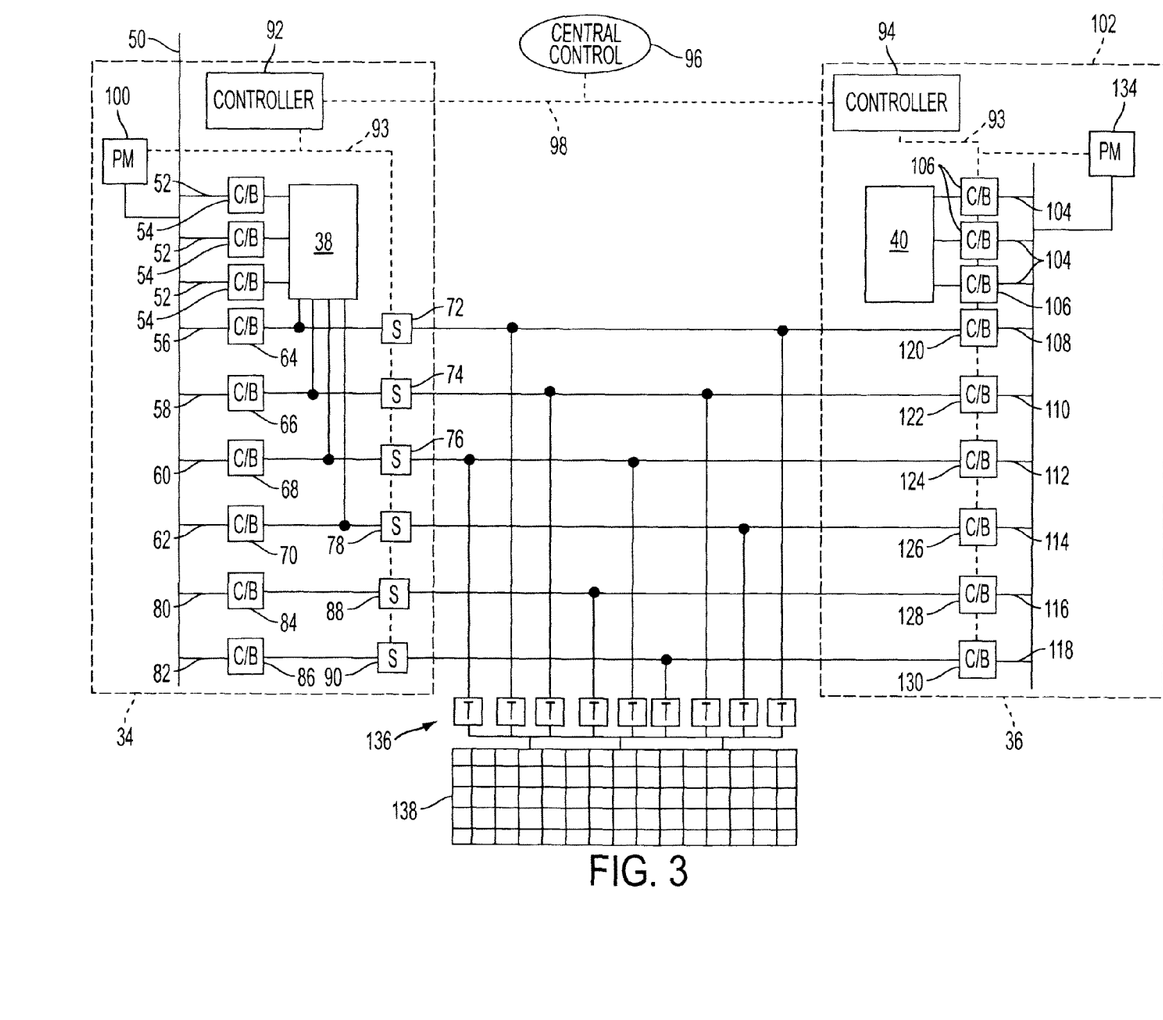
FIG. 3 is a schematic illustration of an alternate embodiment of the interconnected distribution system of FIG. 2; and, FIG. 4 is a flow chart illustration of an exemplary method of operating the interconnected distribution system of FIG. 2.

The methods and systems are not limited to the interconnection of discrete isolated loads. Referring to FIG. 3, another embodiment interconnection is illustrated. In this embodiment, the substations 34, 36 are configured as discussed above with the feeders 56, 58, 60, 62, 80, 82 of the first substation 34 coupled to the feeders 108, 110, 112, 114, 116, 118 of the second substation 36. Similarly circuit breakers 64, 66, 68, 70, 84, 86, 120, 122, 124, 126, 128, 130 and the medium voltage switches 72, 74, 76, 78, 88, 90 allow the disconnection of the respective substations 34, 36. A mini-grid or mini-network 138 is coupled to the substations 34, 36 via plurality of transformers 136 that connected and adapt each individual circuit from the feeders to the mini-grid 138. The mini-grid 138 may be similar to local distribution network 38, but smaller in size, whereas network 38 is fed from one substation 34, the mini-grid 138 has access to two different sources of supply 34, 36.

Figure 4:
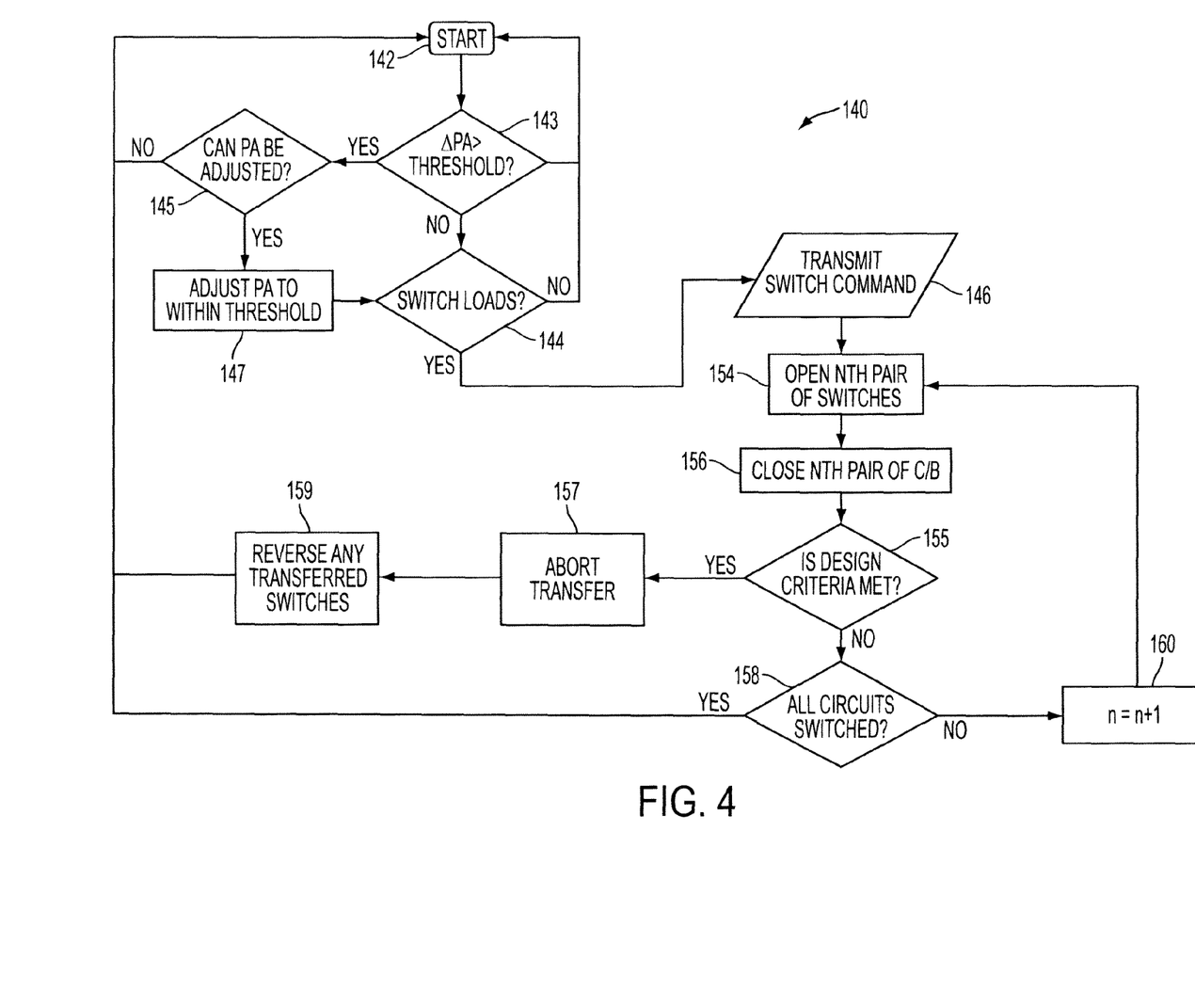

Turning now to FIG. 4, the method of operating a substation feeder interconnection 140 will be described. The method 140 starts in block 142 and proceeds to query block 143 where it is determined if the phase angle is less than a desired threshold. A difference in the phase angles may cause a flow of circulating currents. The circulating currents increases in proportion to the phase angle, which results in a correspondingly larger current. For each set of interconnected loads, there will be a maximum current, and therefore a maximum phase angle differential, that can be tolerated by the connected loads and all other electrical equipment related to substation, such as feeders for example. In one study, for example, the loads were able to tolerate a phase angle differential of up to 8 degrees. This comparison is done for each electrical phase, meaning that an "A" phase in substation 34 is compared with the "A" phase of substation 36.

If query block 132 returns a positive, then the method 140 proceeds to block 145 where it is determined if operational methods may be used to reduce phase angle differential to within the desired threshold. If query block 145 returns a negative, meaning that the phase angle cannot be changed, the method 140 loops back to start block 142 and the process starts again. If the phase angle differential can be adjusted, the operator executes operational methods (not shown) in block 147 to alter the phase angle to within the desired threshold.

Once the phase angle is within the desired threshold parameters, the method 140 proceeds to query block 144 where it is determined whether to switch loads, such as loads 42, 44 for example, from being supplied electrical power from the first substation 34 to an alternate supply from second substation 36. It should be appreciated that this decision may be made in a number of ways. For example, an operator at a central facility may make the decision in light of the operating conditions of the local distribution networks 38, 40. In another embodiment, the decision may be automated and the decision based on factors such as but not limited to power availability, load distribution on local network 38, electrical power usage by the interconnected loads 42, 44, the availability of electrical power from the main transmission system 26, and the availability of electrical power from power plants 22, 44. If query block 144 returns a negative, the method 140 loops back to start block 142 and starts again.

If query block 144 returns a positive, a signal transmitted to switch the loads. The source of the transmission will depend on where the decision in query block 144 was made. For example, if an operator or a computer at a central facility 96 made the decision to switch the loads, the signal may be transmitted over communications medium 98 to controllers 92, 94.

The method 140 then proceeds to block 154. In block 154, a first pair of switches in the first substation 34 is opened. For example, in the exemplary embodiment, the medium voltage switches 72, 74 are opened. At this point, the flow of electrical power from the feeders 56, 58 to the load 42 is interrupted. However, because electrical current is still flowing through feeder 60, load 42 does not experience a power loss. Similarly, since load 44 is still receiving the electrical current via feeders 62, 80, 82, no power loss is experienced by load 44.

After the first pair of switches, medium voltage switches 72, 74 for example, are opened, a first pair of circuit breakers in second substation 36 are closed in block 156. In the example where switches 72, 74 are opened, circuit breakers 108, 110 are closed restoring the flow of electrical current to the loads 42, 44. In the exemplary embodiment, the opening of the switches and the closing of the circuit breakers are performed in a break-before-make relationship. This means that the current flow through the switches is completely halted (e.g. contacts open) before the circuit breakers begin to close. It should be appreciated that since the phase angles of the substations are within the desired threshold, the electrical power may be delivered to the loads from two different sources.

After each pair of switches is opened in block 154 and closed in block 156, the process proceeds to query block 155 where it is determined if there was any issue with the opening or closing of the switches. For example, due to a mechanical issue, one of the switches may have been incapable of opening or closing. If query block 155 returns a positive, the method 140 proceeds to block 157 where the transfer is aborted. The method 140 then performs a reverse transfer in block 159 for any switch pairs that were previously closed and opened. It should be appreciated that this reversal is also performed as a break-before-make relationship as described above. Once the switches have been returned to their normal state, the method 140 loops back to start block 142.

If there were no issues with the switching in query block 155, then method 140 then proceeds to query block 158 where it is determined if all the feeders for loads 42, 44 have been transferred from the first substation 34 to the second substation 36. If the query block 158 returns a negative, the method 140 proceeds to loop back via block 160 to transfer the next pair of switches and circuit breakers. This continues until all the feeders for loads 42, 44 have been transferred from the first substation 34 to the second substation 36. In the example illustrated in FIG. 2, after the circuit breakers 108, 110 close, the medium voltage switches 76, 78 open. In the same break-before-make relationship, the circuit breakers 124, 126 close to restore the flow of electrical current. Finally, the medium voltage switches 88, 90 open followed by the closing of circuit breakers 128, 130. This method of operation provides advantages in the transferring of loads 42, 44 from the first substation 34 to the second substation 36 without loss of service to the end customers.

It should be appreciated that the first substation 34 may disconnect from the loads 42, 44 with the circuit breakers 64, 66, 68, 70, 84, 86 rather than the medium voltage switches 72, 74, 76, 78, 88, and 90. However, the use of the medium voltage switches 72, 74, 76, 78, 88, 90 provides an additional advantage in that some of the feeders, such as feeders 56, 58, 60, 62 may be shared with the local distribution network 38. The use of the medium voltage switches allows feeder to provide power to the local distribution network when the feeder is disconnected from the isolated loads.

Once all the feeders from the first substation 34 that are connected to the isolated loads 42, 44 are transferred to the second substation 36, the query block 158 returns a positive and the method 140 loops back to the start block 142. It should be appreciated that once the circumstances that warrant the transfer of the feeders is alleviated, the loads 42, 44 may be transferred back to the first substation 34 using the same process in reverse. Meaning that a pair of circuit breakers, such as circuit breakers 108, 110 for example, are opened and a pair of switches, such as medium voltage switches 72, 74 for example, are closed. The method of operation proceeds in this manner until all the feeders have been transferred back to the first substation 34.

It should be appreciated that the feeder interconnection system and method of operation disclosed herein provides a number of advantages in the switching of loads from one distribution network to another. The feeder interconnection system and method may minimize or eliminate the loss of service that may be experienced if loads were transferred to a new distribution network using alternative methods. The feeder interconnection system and method may also provide advantages in providing flexibility to an electrical utility to reconfigure the distribution of power to account for changing conditions. Finally, the system and method of operation allows the transferring of loads that are connected by an underground distribution network.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer, as part of a programmable controller, becomes an apparatus for practicing the invention. Execution of the method includes interaction between the controller and the medium voltage switches installed on the feeders to verify the status of the switches, prior and after the commands are issued for their operation. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to manage the transfer of loads from feeders associated with a first substation to an alternate supply of feeders associated with a second substation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method transferring electrical power to a load from a first substation to a second substation, said method comprising:

opening a first pair of switches associated with said first substation, wherein said first pair of switches provide electrical power to a first and second circuit;

closing a first pair of circuit breakers associated with said second substation, wherein said first pair of circuit breakers provide electrical power to said first and second circuit;

opening a second pair of switches associated with said first substation, wherein said second pair of switches provide electrical power to a third and fourth circuit; and, closing a second pair of circuit breakers associated with said second substation, wherein said second pair of circuit breakers provide electrical power to said third and fourth circuit.

2. The method of claim 1 wherein said first pair of switches and said first pair of circuit breakers are opened and closed in a time sequential break-before-make relationship.

3. The method of claim 2 wherein said second pair of switches and said second pair of circuit breakers are opened and closed in a time sequential break-before-make relationship.

4. The method of claim 3 wherein said first pair of circuit breakers are closed before said second pair of switches are opened.

5. The method of claim 4 wherein said first circuit, said second circuit and said third circuit are coupled to a load.

6. The method of claim 5 further comprising the step of determining an electrical phase angle difference between said first substation and said second substation.

7. The method of claim 6 further comprising the step of adjusting an electrical phase angle associated with said second substations if said electrical phase angle difference is greater than a threshold.

8. The method of claim 7 wherein said second substation electrical phase angle is adjusted before said first pair of switches is opened.

9. A method of operating a transferable feeder system comprising:
    determining an electrical phase angle difference between a first substation and a second substation;
    determining if said phase angle difference exceeds a threshold;
    adjusting a phase angle associated with said second substation such that said phase angle difference is within said threshold;
    opening first switch and a second switch associated with said first substation, wherein said first switch and said second switch provide electrical current to a first and second circuit;
    closing a first circuit breaker and second circuit breaker associated with said second substation, wherein said first circuit breaker and said second circuit breaker provide electrical current to said first circuit and said second circuit;
    opening a third switch and a fourth switch associated with said first substation, wherein said third switch and fourth switch provide electrical current to a third circuit and fourth circuit; and,
    closing a third circuit breaker and fourth circuit breaker associated with said second substation, wherein said third circuit breaker and fourth circuit breaker provide electrical power to the third and fourth circuit.

10. The method of claim 9 wherein said first switch and said second switch open, and said first circuit breaker and said second circuit breaker close in a make-before-break relationship.

11. The method of claim 10 further comprising:
    providing electrical power to said first substation from a first source; and,
    providing electrical power to said second substation from a second source.

12. A transferable feeder system comprising:
    a first substation having a first pair of feeders and a second pair of feeders, wherein each feeder in said first pair of feeders and said second pair of feeders has an associated switch;
    a second substation having a third pair of feeders electrically coupled to said first pair of feeders, and a fourth pair of feeders electrically coupled to said second pair of feeders, wherein each feeder in said third pair of feeders and said fourth pair of feeders has an associated circuit breaker;
    at least one load electrically coupled to said first pair of feeders, said second pair of feeders, said third pair of feeders and said fourth pair of feeders; and,
    a controller associated with said first substation and said second substation, said controller being disposed in communication with said switches associated with said first pair of feeders and said circuit breakers associated with said third pair of feeders, said controller including a processor responsive to executable computer instructions for opening said switches associated with said first pair of feeders and closing said circuit breakers associated with said third pair of feeders in response to receiving a command signal.

13. The transferable feeder system of claim 12 wherein said controller is further disposed in communication with said switches associated with said second pair of feeders and said circuit breakers associated with said fourth pair of feeders, wherein said processor is further responsive to executable computer instructions for opening said switches associated with said second pair of feeders and closing said circuit breakers associated with said fourth pair of feeders in response to closing said circuit breakers associated with said third pair of circuit breakers.

14. The transferable feeder system of claim 13 further comprising:
    a first phase angle meter coupled to said first substation; and,
    a second phase angle meter coupled to said second substation.

15. The transferable feeder system of claim 14 wherein said controller is further disposed in communication with said first phase angle meter and said second phase angle meter, wherein said processor is further responsive to executable computer instructions for determining a phase angle difference in response to receiving a first signal from said first phase angle meter and a second signal from said second phase angle meter.

16. The transferable feeder system of claim 15 wherein said processor opens said first pair of switches and closes said first pair of circuit breakers in a break-before-make relationship.

17. The transferable feeder system of claim 16 wherein said processor opens said second pair of switches and said second pair of circuit breakers in a break-before-make relationship.

18. The transferable feeder system of claim 17 further comprising a first electrical load electrically coupled to said first pair of switches.

19. The transferable feeder system of claim 16 wherein said processor is further responsive to opening said first pair of circuit breakers and closing said first pair of switches in a break-before-make relationship in response to either said first pair of switches failing to open or said first pair of circuit breakers failing to close.

20. The transferable feeder system of claim 19 wherein said processor is further responsive to opening said second pair of circuit breakers and closing said second pair of switches in a break-before-make relationship and then opening said first pair of circuit breakers and closing said first pair of switches in a make-before-break relationship in response to either said second pair of switches failing to open or said second pair of circuit breakers failing to close.

* * * * *